(12) United States Patent
Canter et al.

(10) Patent No.: US 10,789,801 B2
(45) Date of Patent: Sep. 29, 2020

(54) ELECTION VOTING SYSTEM USING PRINTED VOTE RECORDS (71) Applicants: James M. Canter, Austin, TX (US); Raul G. Palacios, Erie, CO (US)

(72) Inventors: James M. Canter, Austin, TX (US); Raul G. Palacios, Erie, CO (US)

(73) Assignees: Hart InterCivic, Inc., Austin, TX (US); Brother Mobile Solutions, Inc., Westminster, CO (US)

(*) Notice: Subject to any disclaimer, the term of this patent is extended or adjusted under 35 U.S.C. 154(b) by 0 days.

(21) Appl. No.: 16/517,011

(22) Filed: Jul. 19, 2019

(65) Prior Publication Data
US 2020/0035053 A1 Jan. 30, 2020

Related U.S. Application Data (60) Provisional application No. 62/703,974, filed on Jul. 27, 2018.

(51) Int. Cl.
*G07C 13/00* (2006.01)
*H04N 1/00* (2006.01)

(52) U.S. Cl.
CPC .......... *G07C 13/00* (2013.01); *H04N 1/00689* (2013.01); *H04N 1/00694* (2013.01); *H04N 1/00721* (2013.01); *H04N 1/00734* (2013.01); *H04N 1/00761* (2013.01)

(58) Field of Classification Search
CPC .......... H04N 1/00689; H04N 1/00694; H04N 1/00721; H04N 1/00734; H04N 1/00761; G07C 13/00
See application file for complete search history.

(56) References Cited

U.S. PATENT DOCUMENTS

| | | | | |
|---|---|---|---|---|
| 6,386,671 B1* | 5/2002 | Huston | ...... | B41J 3/01 |
| | | | | 235/462.08 |
| 8,814,045 B1* | 8/2014 | Brockhouse | ...... | G07C 13/00 |
| | | | | 235/386 |
| 2003/0072019 A1* | 4/2003 | Haines | ...... | G06K 15/186 |
| | | | | 358/1.12 |
| 2006/0250627 A1* | 11/2006 | Silverbrook | ...... | B41J 3/445 |
| | | | | 358/1.12 |
| 2009/0160927 A1* | 6/2009 | Hillis | ...... | B41J 2/32 |
| | | | | 347/211 |

* cited by examiner

*Primary Examiner* — Laura A Gudorf
(74) *Attorney, Agent, or Firm* — Egan Peterman Enders Huston (57) ABSTRACT

An election voting system is provided. The election voting system includes a printer for accepting printer medium. In one embodiment, the printer medium may be a paper printer medium. The printer medium includes mark(s) positioned on the printer medium that may be utilized to determine whether the printer medium is inserted into the printer in the proper orientation. The election voting system may include a sensor that identifies the presence of the mark. Two marks are positioned so that the orientation of the paper (right side up versus upside down) can be determined. In addition, in one embodiment, the marks are positioned so that even if the printer medium is rotated 180 degrees, orientation as to which side is up may be detected.

20 Claims, 5 Drawing Sheets

ELECTION VOTING SYSTEM USING PRINTED VOTE RECORDS

This application claims priority to Provisional Patent Application No. 62/703,974 filed Jul. 27, 2018, the disclosure of which is expressly incorporated herein by reference

BACKGROUND OF THE INVENTION

The present disclosure relates to the voting systems for elections. More specifically, it relates to voting systems utilizing printed vote records.

A variety of voting systems for use in various federal, state, county and local elections are well known. As voting technology has improved over time, electronic voting systems have become the preferred voting mechanism. Some electronic voting systems may be paperless voting systems. Alternatively, some electronic voting systems utilize paper. For example, a voter may make voting selections electronically on an electronic voting machine and the voter's selections may then be printed out on printed vote records. The printed vote records may then be utilized in a variety of manners. For example, printed vote records may be manually counting. In another example, the printed vote records may then be electronically scanned for casting a vote. In another exemplary use of printing in an electronic voting system, a voter may make voting selections on an electronic voting machine. The voter's selections may be cast and recorded directly on the electronic voting machine. Such systems are often referred to as direct record voting (DRE) systems. However, even in DRE systems printing may be utilized at the polling place. For example, a printed record of the voter's selections may be provided to the voter. The printed record may be utilized as a visual presentation provided to the voter that confirms to the voter the selections which were electronically cast. In another DRE embodiment, the printed vote records may be used for audit and recount purposes. Thus, as used herein, a printed "vote record" is not limited to a printed medium that is used for casting a voter's vote. Rather, "vote record" is more generally used to include records of voter's voting selections. Thus, for example, as used herein a paper record provided to a voter as part of DRE system may also be considered to be a "vote record."

A wide range of printing mechanism are known for use in voting systems, including but not limited to toner based printers (such as laser printers), inkjet printers, thermal printers, etc. Thermal printers are particularly advantageous in regards to portability, printing speed, and costs. Further, because such printers may be inkless, the only consumable product is typically the printed medium (for example thermal paper) itself. Though vote records are typically paper or paper based, the use of vote records as described herein is not limited to paper based products and would include any of a variety of other printer medium, including synthetic medium.

Independent of what type of printers and printer mediums may be utilized in a voting system, insertion of the printer medium into the printer may be problematic. For example, many voting processes require a voter to insert the printer medium into the printer. However, as the individual voter may be unfamiliar with the voting equipment, the voter may misfeed the printer medium into the printer. Such misfeeds may occur by placing the voting medium in the voting machine upside down. In the case of thermal paper, which only prints on one side, such upside down insertion will result in no printing on the voting medium. Further, even in the case of feeding the printer medium right side up, the orientation of the printer medium could be rotated 180 degrees, resulting in a misprinted vote record.

It would be desirable to provide a more robust voting system for the handling of printed medium.

SUMMARY OF THE INVENTION

An election voting system is provided. The election voting system includes a printer for accepting printer medium. In one embodiment, the printer medium may be a paper on which a vote record is printed. The printer medium includes marks positioned on the printer medium that may be utilized to determine whether the printer medium is inserted into the printer in the proper orientation. The election voting system may include a sensor that identifies the presence of the marks. The marks are positioned so that the orientation of the paper (right side up versus upside down) can be determined. In addition, in one embodiment, the marks are positioned so that even if the printer medium is rotated 180 degrees (top and bottom), orientation as to which side is up of the printer medium may be detected.

In one embodiment, the present disclosure describes a method for printing a voter's selections in an election. The method may comprise providing an election voting device the election voting device configured to allow a voter to make the voter's selections, wherein the election voting device includes a printer. The method further comprises detecting a proper insertion of a valid election printer medium and detecting the orientation of a print side or a back side of the election printer medium, wherein the detection of the orientation is independent of a 180 degree rotation of the election printer medium. The method further comprises proceeding with a voting process if the orientation is detected as being correct and halting the voting process if the orientation is detected as not being correct.

In another embodiment, the present disclosure provides an election printer medium configured to be used for printing vote records in an election voting system. The election printer medium comprises a print side of the election printer medium, the print side of the election printer medium configured to have a region on which a printed vote record of an election voting system may be provided. The election printer medium further comprises a back side of the election printer medium, the back side opposing the print side. The election printer mechanism further comprises a first orientation mark, the first orientation mark being located on a first side, the first side being one of the print side or back side. The election printer mechanism further comprises a second orientation mark, the second orientation mark being located on the first side, wherein the first orientation mark is located at a first end of the election printer medium and the second orientation mark is located at a second end of the election printer medium, and wherein the first orientation mark and the second orientation mark provide optical contrast from other portions of the election printer medium such that optical detection of the first orientation mark and second orientation mark may be detected before the printer prints on the election printer medium.

In yet another embodiment, an election voting system is provided. The election voting system may comprise an election voting device, the election voting device including at least a display. The election voting system further comprises a printer, the printer coupled to the election voting device so that printed vote records may be printed from the print based on voting at the election voting device. The election voting system further comprises an election printer medium. The election printer medium comprises (1) a print side of the election printer medium, (2) a back side of the election printer medium, the back side opposing the print side, (3) a first orientation mark, the first orientation mark being located on a first side, the first side being one of the print side or back side, and (3) a second orientation mark, the second orientation mark being located on the first side, wherein the first orientation mark is located at a first end of the election printer medium and the second orientation mark is located at a second end of the election printer medium, and wherein the first orientation mark and the second orientation mark provide optical contrast from other portions of the election printer medium such that optical detection of the first orientation mark and second orientation mark may be detected before the printer prints on the election printer medium. The election voting system further comprises an optical sensor, the optical sensor located at an entrance to the printer, the election voting device controlling an election process flow based at least in part upon detection by the optical sensor of at least one of the first orientation mark and the second orientation mark.

BRIEF DESCRIPTION OF THE DRAWINGS

A more complete understanding of the present invention and advantages thereof may be acquired by referring to the following description taken in conjunction with the accompanying drawings, in which like reference numbers indicate like features. It is to be noted, however, that the accompanying drawings illustrate only exemplary embodiments of the disclosed concept and are therefore not to be considered limiting of its scope, for the disclosed concept may admit to other equally effective embodiments.

DESCRIPTION OF THE PREFERRED EMBODIMENTS

An election voting system is provided. The election voting system includes a printer for accepting printer medium. In one embodiment, the printer medium may be a paper medium on which a vote record is printed. The printer medium includes marks positioned on the printer medium that may be utilized to determine whether the printer medium is inserted into the printer in the proper orientation. Thus, the marks may be considered to be orientation marks. The election voting system may include a sensor that identifies the presence of the marks. The orientation marks are positioned so that the orientation of the paper (right side up versus upside down) can be determined. In addition, in one embodiment, the marks are positioned so that even if the print medium is rotated 180 degrees (top to bottom), orientation as to which side is up may be detected.

Figure 1:
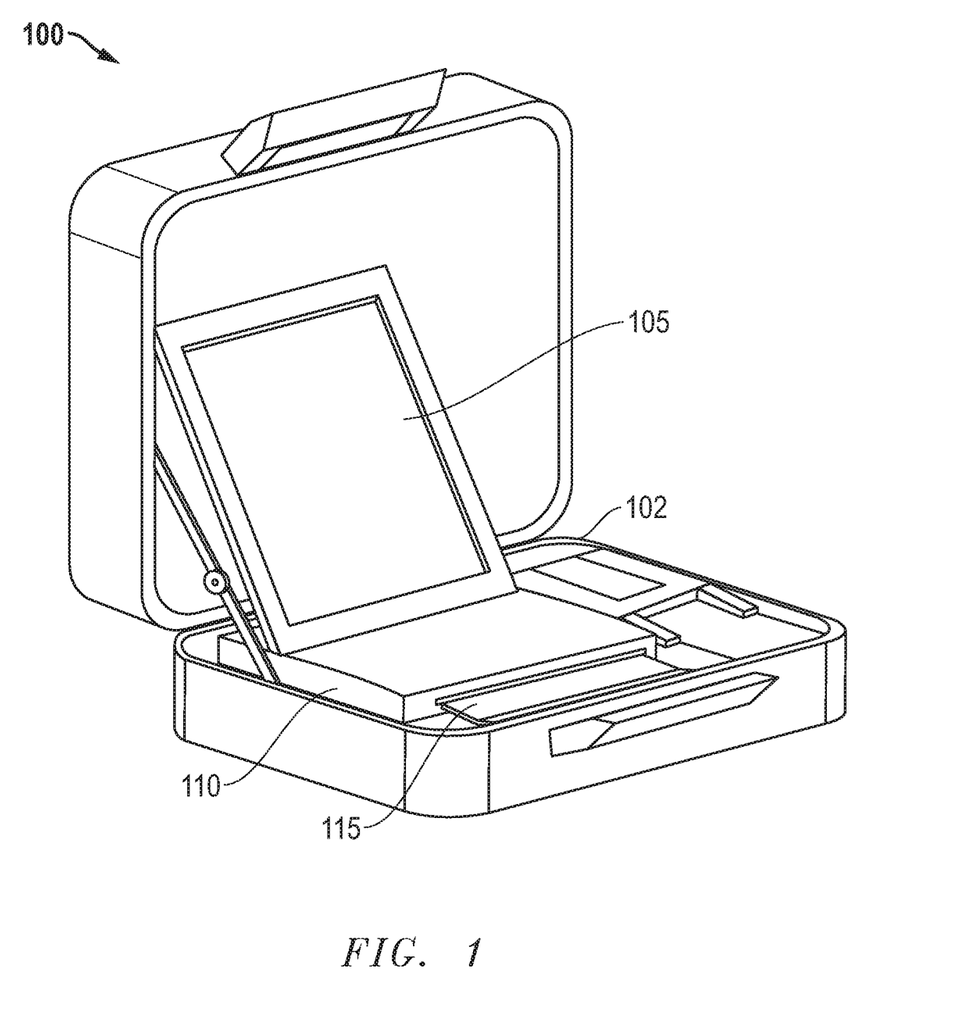
FIG. 1 illustrates an exemplary election voting system.

FIG. 1 illustrates an election voting system 100. The election voting system 100 may include an election voting device 102 which uses printer medium such as, for example, shown in FIG. 3. The election voting device 102 may include a display 105, a voting processing unit 110 and a printer medium input tray 115. The vote voting processing unit 110 may include a variety of hardware and software, including a memory, processors, associated election software, input devices, etc., all as is known in the art. In operation, a voter may utilize the election voting device 102 as part of the process of casting a vote in an election. The voter may be provided instructions and voting choices that are presented on the display 105 of the election voting device 102. Various voter responses and election selections may be entered via the display (in the case of a touchscreen display) or may entered via other inputs such as a keypad, buttons, dials, etc. that may be part of the voting processing unit 110. The election voting device 102 may also include an internal printer. The printer may be utilized to print a voter's selections on a printed vote record. As discussed above, after printing, the printed vote record may be subsequently cast and tabulated (for example by scanning to record a voter's election selections as indicated on the printed vote record) or the printed vote record may merely be used as a verification provided to a voter as to the voter's voting selections (such as in the case of a DRE system in which the voting cast vote record is electronically cast directly by the voting processing unit 110). It will be recognized, however, that the uses of a printed vote record as described herein are merely exemplary and the concepts and techniques described herein may be utilized for a wide variety of applications of election printer medium as utilized with an election voting device.

The election voting device 102 may include a printer medium input tray 115. As mentioned, printer medium may be inserted into the printer medium input tray 115 for a variety of reasons, depending upon the particular voting process implemented with the election voting system 100. When a voter feeds a printer medium into the printer medium input tray 115, a sensor of the printer may sense the presence of printer medium being inserted. Such sensor may be mechanical, optical, etc. as is known in the art. As described herein, the printer may also include an optical printer medium orientation sensor. The optical printer medium orientation sensor operates to detect an orientation of the printer medium. The optical printer medium orientation sensor may also be utilized as the initial sensor utilized to merely detect the presence of printer medium or the optical printer medium orientation sensor may be a separate sensor.

Figure 2:
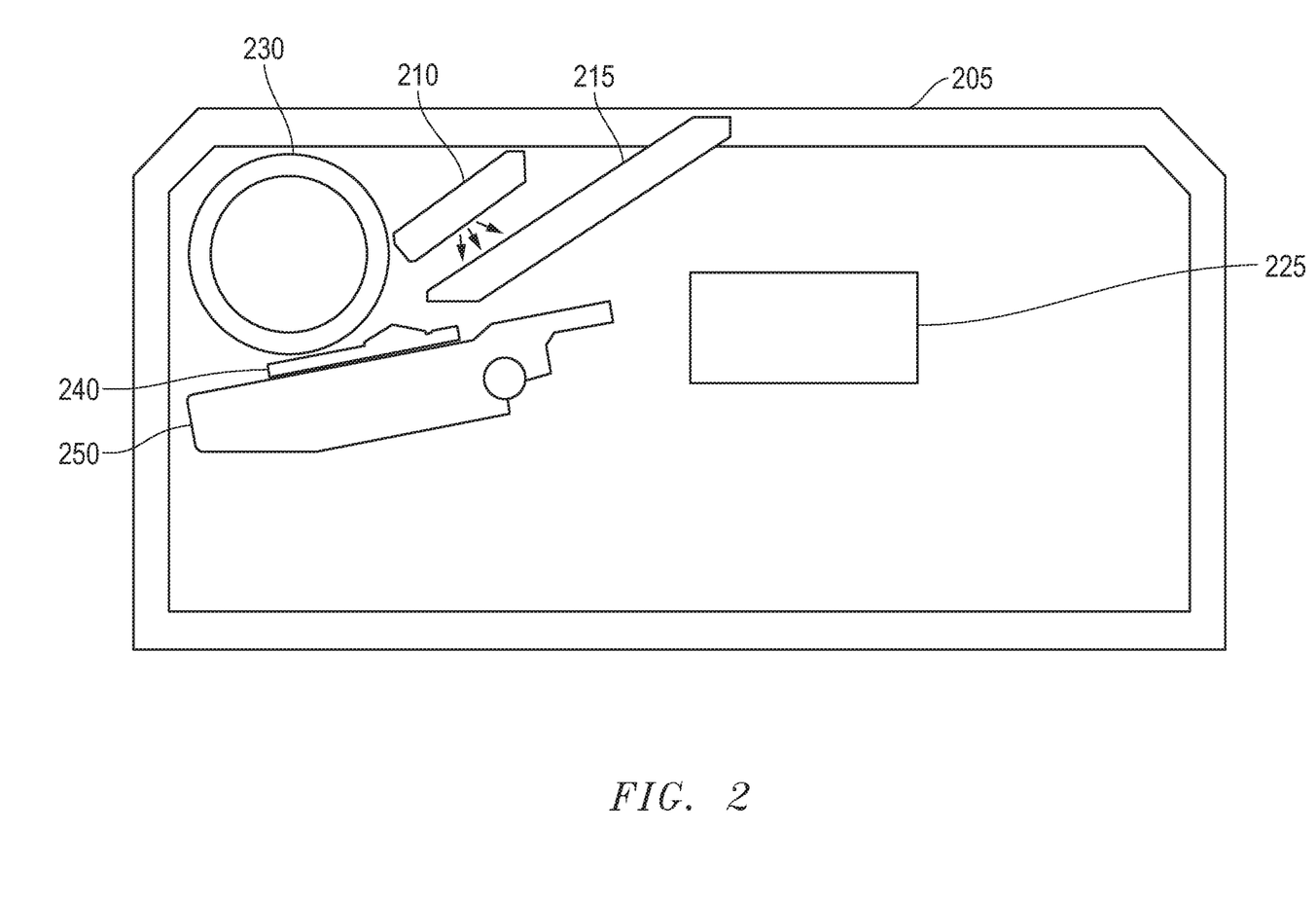
FIG. 2 illustrates an exemplary printer sensor of the election voting device of FIG. 1

FIG. 2 illustrates one exemplary embodiment of a printer 205 for inclusion in the voting device 102 of FIG. 1. As shown in FIG. 2, the printer 205 includes a paper guide 215 (or "chute") to receive paper from the printer medium input tray 115 of the election voting device 102. The printer 205 also includes an optical printer medium orientation sensor 210. The sensor is a reflective sensor that emits infrared light and senses light that bounces back from underlying surfaces. The optical printer medium orientation sensor 210 may be coupled to printer control electronics 225 which may control and receive feedback from a platen 230, a print head 240, the optical printer medium orientation sensor 210 and other printer mechanisms (not shown) utilized to effectuate printing on the printer medium. A heat sink 250 may also be provided. It will be recognized that the printer 205 may be any of a wide variety of types of printers known in the printing art, including but not limited to thermal printers, laser printers, inkjet printers, etc. Further, the internal printer mechanisms may include a wide range of devices and structures all as is known in the printer art. The optical printer medium sensor 210 may include a light source and a light detector. In operation, light from the light source may be projected from the optical printer medium sensor 210 and reflected light may be detected by the light detector. For example, the optical printer medium sensor 210 may include a light emitting diode (LED) and a photodiode detector. In one exemplary embodiment, the light that is emitted and sensed is infrared light. However, it will be recognized that other types and varieties of sensors may be utilized.

In operation, the optical printer medium sensor 210 may detect the presence of printer medium being inserted into the printer medium input tray 115. For example, the optical printer medium sensor 210 may detect the reflectivity change that results when printer medium is inserted into the printer medium input tray 115 versus the baseline reflectivity of the printer medium input tray 115 without printer medium present. For example, the reflectivity difference of a white printer medium versus a black plastic printer medium input tray may be detected. As mentioned above, the mere presence of printer medium may alternatively be detected by a separate sensor.

In the embodiment of FIG. 2, the optical printer medium sensor 210 is configured to operate in conjunction with the printer medium itself so as to detect printer medium orientation, in particular whether the printer medium is inserted right side up or upside down. For example, for a thermal printer, the thermal printer medium has a print side and a back side. Typically, the thermal printer medium includes a substrate layer and print coating layer. Typically the print coating layer (the print side) is placed so that it engages the thermal printer head of the thermal printer while the substrate layer (back side) is the opposite side. If the thermal printer medium is orientated upside down, the data to be printed on the printer medium is not printed when the printer medium passes the thermal print head.

Figure 3:
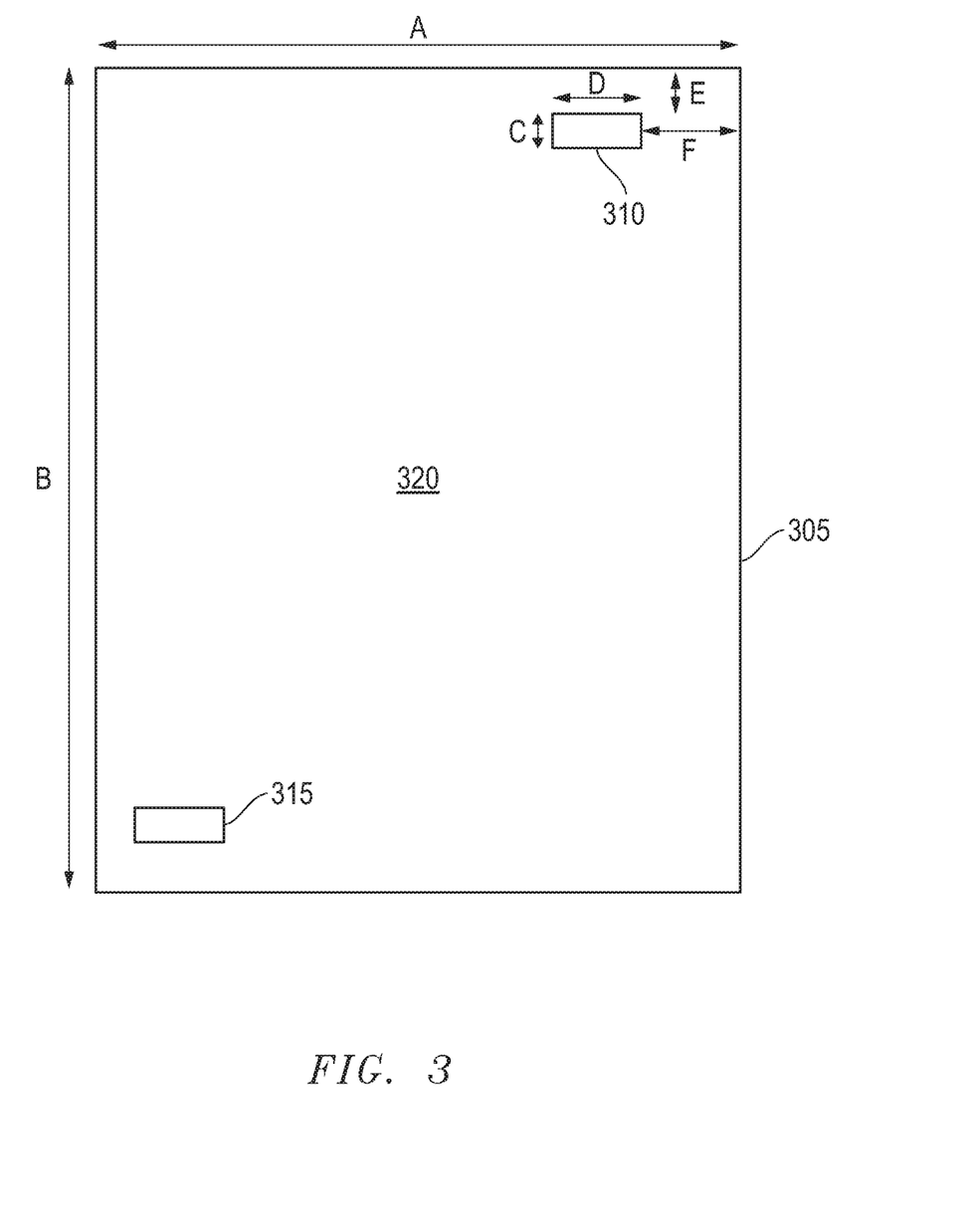
FIG. 3 illustrates an exemplary printed medium for use with the election voting device of FIG. 1.

FIG. 3 illustrates an exemplary printer medium 305 (in one example a paper printer medium). In one exemplary configuration, the printer medium is a thermal printer medium. As shown, the printer medium 305 includes two orientation marks, mark 310 and mark 315. Mark 310 and mark 315 may be black so as to provide a reflective contrast to the white printer medium 305. It will be recognized that the marks may be configured in other manners so as to present a distinction between the mark and the printer medium. For example, other color configurations may be utilized, bar codes may be utilized, alphanumerics may be utilized, different reflective materials may be utilized, etc.

In operation, the mark 310 and mark 315 are placed on one side of the printer medium 305. By detecting versus not detecting the marks 310 and 315 with the optical printer medium sensor 210, the printer in voting device 102 may determine the orientation of the printer medium 305 as it is inserted into the printer medium input tray 115. If the printer medium 305 is determined to have been inserted right side up, then the voting process may proceed. If the printer medium 305 is determined to have been inserted upside down, an error message may alert the voter to turn over and reinsert the printer medium 305. An exemplary voting process flow is described in more detail below.

Whether the marks 305 and 310 are placed on the print side or the back side of the printer medium 305 will depend upon the location of the optical printer medium sensor 210 (under or above the printer medium) and whether the printer 205 prints on the top side or bottom side (in relation to insertion) of the printer medium 305. Thus, marks could be on either on the print side or back side depending upon the particular printer. It will be recognized, however, that use of the marks may enable the election voting system 100 to determine whether the printer medium 305 has been properly orientated with regard to the print side and back side. Independent of which side the marks are located on, a region 320 is provided on the printer medium in which a printed vote record may be created by the printer. If the marks are located on the print side of the printer medium, generally the marks may be spaced apart in a manner that the marks are outside of the region in which the printed vote record is created. However, such spacing is not mandatory.

As shown in FIG. 3, the mark 310 and mark 315 are located diagonally opposite each other on the printer medium 305. By utilizing two marks, the printer 205 may detect the beginning of the printer medium 305 no matter whether the printer medium is rotated 180 degrees (rotation with respect to which end of the printer medium is inserted first). If only a single mark is utilized, the optical printer medium sensor 210 may or may not detect the beginning of the printer medium 305 depending upon whether a voter inserted the printer medium 305 with a mark oriented at the leading edge of the printer medium or not. The use of two marks, one at each end of the printer medium 305 allows a voter to insert either end of the printer medium in first as the leading edge while still allowing detection of the beginning of the printer medium 305.

As illustrated in the embodiment of FIG. 3, the mark 310 and the mark 315 are located diagonally symmetric from each other on the printer medium 305. Thus, no matter which end of the printer medium 305 is inserted by the voter first, the printer 205 will look for a mark in the same place so as to make the determination as to whether the paper is oriented properly as to print side and back side. It will be noted that other embodiments may also be utilized. For example, asymmetrical marks could be utilized to provide even further detail as to the insertion of the paper. Thus, two asymmetrical marks could provide orientation information as to both the print side versus back side as well as information as to which end is inserted first. A wide range of dimensions may be utilized for both the size of the printer medium and the location and size of the marks 310 and 315. In one exemplary embodiment, as shown in FIG. 3 the marks may be located at specific locations on the printer medium. For example, the printer medium may have known dimensions (dimensions A and B of the figure) and the marks 310 and 315 may have a known height C and width D respectively. The marks 310 and 315 may be located at known distance E from the top/bottom edge and distance F from the sides. The known size of the printer medium and known placement of the marks may then be utilized as part of the process of sensing the proper insertion of a valid election printer medium. The location of the marks 310 and 315 may be chosen to allow sufficient space between the leading edge of the printer medium 305 and the marks for the optical sensor to detect white space of the printer medium while at the same time minimizing the amount of the printer medium 305 which needs to be entered into the printer (i.e. minimizing the amount of the printer medium 305 that is loaded into the printer by the printer rollers 230). The size of the marks 310 and 315 may be chosen to provide sufficient repeatable detection of the marks by the particular sensor utilized.

The particular voting process flow that utilizes the concepts described herein may vary. In one exemplary embodiment, a voter first inserts the printer medium into the voting machine. The printer then detects the white reflection of the printer medium and feeds the print medium into the printer mechanism. If the printer optical sensor detects the black reflection transition of the marks within an expected distance, the printer continues to feed the printer medium until a transition to white is detected, indicating the end of the black mark. If the detected black mark meets the feed distance measurement requirements, then the printer reports a proper printer medium load to the voting device and the voting process may continue. If the black mark detection does not meet the feed distance criteria, then the printer reports that an incorrect printer medium load has occurred and appropriate actions may occur (printer may reverse the printer medium to unload it, an error message may be presented to the voter, an error message presented to an election official, etc.).

Figure 4:
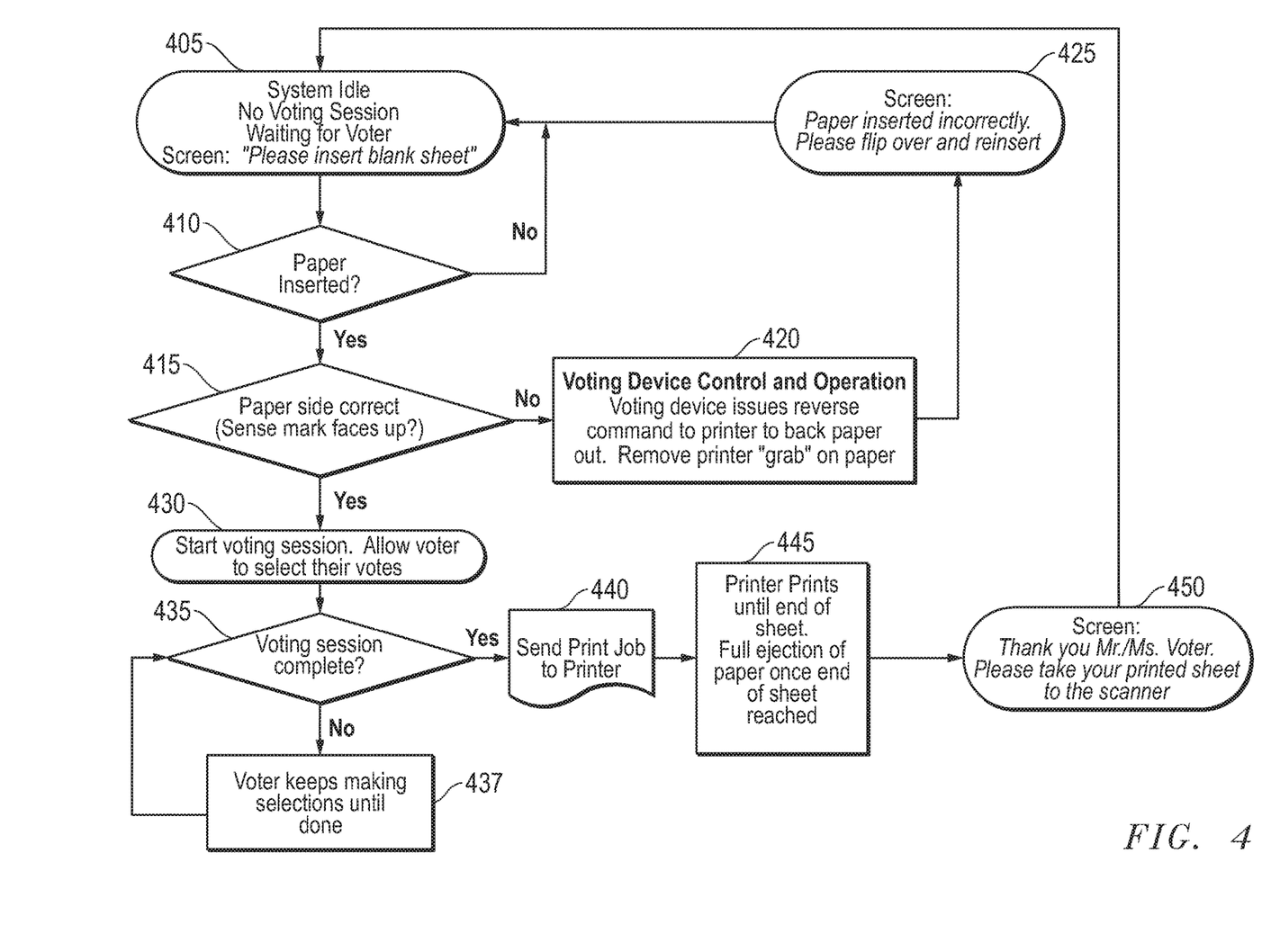
FIG. 4 illustrates an exemplary printing process for use with an election voting device.
Figure 5:
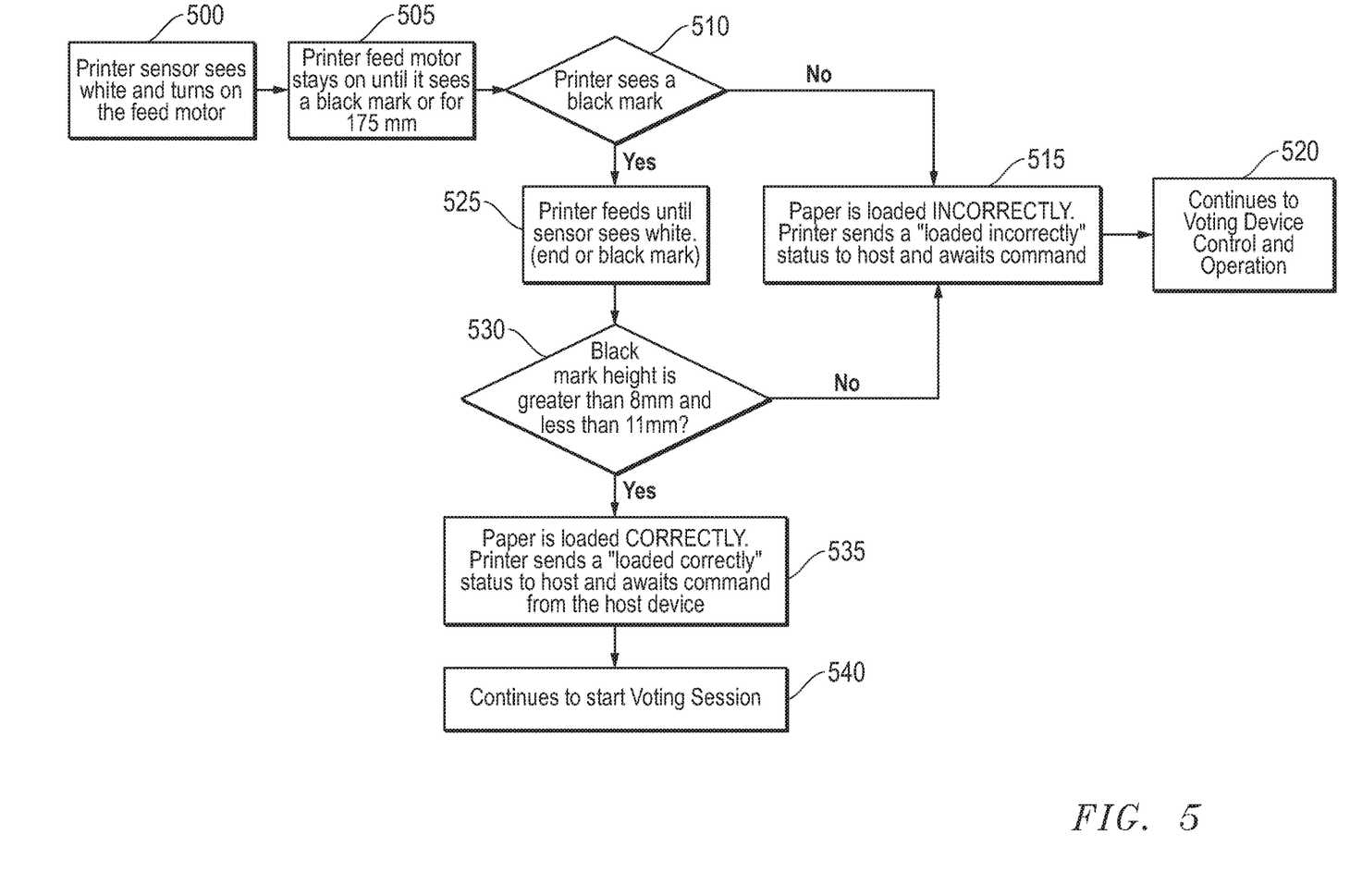
FIG. 5 illustrates an exemplary process for sensing a printer medium at the printer of an election voting device.

FIGS. 4 and 5 present more details of an exemplary voting process flow for an election voting system utilizing the election voting device and printer medium described herein. It will be recognized that the voting processes described are merely exemplary and many other voting process flows may utilize the concepts described herein. As shown in FIG. 4, a voting system may be idle at block 405, waiting for a voter and presenting on the display "Please insert blank sheet." Control proceeds to block 410 in which detection of printer medium at the printer medium input tray is detected. If no printer medium is detected, control returns to block 405. When printer medium is detected at block 410, control passes to block 415 at which point the system determines if the printer medium is inserted correctly. For example, block 415 detects is the printer medium has been inserted with the correct side up (in one embodiment, with the sense marks face up in the printer medium input tray. A more detailed view of the process that occurs within block 415 is described with regard to the process flow of FIG. 5 (which is discussed in more detail below). If the printer medium is determined to be placed incorrectly in block 415, control passes to block 420. In block 420, the electronic voting device issues a reverse command to the printer so that the printer medium may be backed out, thus removing the printer's "grab" on the printer medium. Control then passes to block 425 at which point the display screen may provide a message to the user "Paper inserted incorrectly. Please flip over and reinsert." Control then may return to the system idle block 405.

If it was determined at block 415 that the printer medium was inserted with the correct side up, control passes to block 430, at which point the electronic voting device allows the voting process to continue. At block 435 it is determined whether the voter has completed voting. If the decision at block 435 is no, control proceeds to block 437 at which a voter continues making voting choices after which control passes to decision block 435. If at block 435 it has been detected that voting has been completed, the voting process proceeds to block 440, at which point the electronic voting device sends a printed vote record print job to the printer. At Block 445, the printer prints the vote record on the printer medium until the end of the sheet of the printer medium is detected, at which point the completed printed vote record is ejected. At block 450, the system presents instructions to a voter to take the printed vote record from the electronic voting device and proceed to the vote record scanner (or whatever the next step in the voting process is).

As mentioned above, the detection process of decision block 415 of FIG. 4 is shown in more detail in FIG. 5. More specifically as shown in FIG. 5, at block 500 the printer sensor detects white of the printer medium and the feed motor of the printer is activated. The printer feed motor then continues to feed the printer medium into the printer until the optical sensor detects one of the black marks or for some predetermined distance (for example 175 mm of printer medium). Control then proceeds to decision block 510 where it is determined if a black mark has been detected by the optical sensor. If no mark was detected, control passes to block 515. At block 515, the printer sends a "loaded incorrectly" status signal to the electronic voting device. At block 420, control then returns to the process flow of FIG. 4, more specifically to the "No" decision branch of block 415 which is provided to block 420 of FIG. 4.

If the optical sensor does detect the black mark in decision block 510, control continues to block 525 where the printer continues to feed the printed medium until the sensor sees white again (a transition that indicates the end of the black mark). At block 530, the size of the detected mark is then calculated and a decision is made as to whether the size falls within an acceptable range. For example, an acceptable range of the 0.38 inch (9.5 mm) mark of FIG. 3 may be 8 mm to 11 mm. If the size of the detected mark is not acceptable, control passes to block 515 and proceeds as described above. If the detected mark is within the acceptable size, control passes to block 535 at which point the printer sends a "loaded correctly" status to the host device (the election voting device). At block 540, the voting session continues as control then returns to the process flow of FIG. 4, more specifically to the "Yes" decision branch of block 415 which is provided to block 430 of FIG. 4.

As mentioned, the printer medium detection techniques described herein may be utilized with wide variety of voting process flows, and not just those described herein. For example, in one embodiment the process flow may proceed by (1) detecting the printer medium orientation, (2) then allowing voting selections, and (3) then printing the selections on a printed vote record. However, the process flow may alternatively utilize the detection techniques at other stages of the process flow or in a different sequence of steps. For example, the voting process flow may entail a voter inserting a printer medium after vote selections have been made. In such case, the orientation of the printer medium and alerts provided to the voter are provided after the voting selections are made, but still before printing occurs.

The election voting system described herein provides for an easy printer medium loading system which can efficiently detect correct or incorrect printer medium loading by the voter. Thus, a voting device is provided that can utilize an optical sensor to detect the presence of a printer medium (typically differentiating white of the printer medium and a darker color of the printer hardware plastic) and also can detect a mark on the printer medium to determine if the printer medium is inserted right side up or not. Control of the printing process is integrated with the voting process so that the election voting system has full control to allow the process to proceed after printer medium insertion or to alert a voter of the need to take corrective action in the case of the detection of improper printer medium insertion. The printer medium utilizes marks on both ends of the printer medium so as to allow paper orientation detection independent as to which end of the printer is inserted into the printer first.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms and methods of the invention herein shown and described are to be taken as presently preferred embodiments. Equivalent techniques may be substituted for those illustrated and described herein and certain features of the invention may be utilized independently of the use of other features, all as would be apparent to one skilled in the art after having the benefit of this description of the invention.

What is claimed is:

1. A method for printing a voter's selections in an election, comprising:
    providing an election voting device the election voting device configured to allow a voter to make the voter's selections, wherein the election voting device includes a printer;
    detecting a proper insertion of a valid election printer medium;
    detecting the orientation of a print side or a back side of the election printer medium, wherein the detection of the orientation is independent of a 180 degree rotation of the election printer medium such that printing of the voter's selections is not dependent upon the 180 degree rotation of the election printer medium; and
    proceeding with a voting process if the orientation of the print side or the back side of the election printer medium is detected as being correct, the proceeding with the voting process occurring independent of a 180 degree rotation of the election printer medium, and halting the voting process if the orientation of the print side or the back side of the election printer medium is detected as not being correct.

2. The method of claim 1, wherein printing of a voter's selections occurs after the orientation is detected as being correct.

3. The method of claim 2, further comprising:
    after detecting the orientation of the print side or the back side of the election printer medium, presenting voting options to the voter if the orientation is detected as being correct; and
    printing the voter's selections on the printer medium.

4. The method of claim 1, further comprising:
    after detecting the orientation of the print side or the back side of the election printer medium, presenting voting options to the voter if the orientation is detected as being correct; and
    printing the voter's selections on the printer medium.

5. The method of claim 1, wherein the printer medium comprises at least one orientation mark.

6. The method of claim 5, wherein the at least one orientation mark allows for distinguishing between the print side and the back side of the printer medium.

7. The method of claim 6, wherein the at least one orientation mark comprises at least two orientation marks, the at least two orientation marks being on a first side of the printer medium.

8. The method of claim 7, wherein a first orientation mark being located on the first side of the printer medium at a first end of the printer medium and a second orientation mark being located on the first side of the printer medium at a second end of the printer medium.

9. The method of claim 8, the first orientation mark and the second orientation mark being located diagonally across the printer medium.

10. The method of claim 9, the location of the first orientation mark and the second orientation mark being diagonally symmetrical.

11. The method of claim 10, the printer medium being a thermal printer medium.

12. The method of claim 1, the printer medium being a thermal printer medium.

13. The method of claim 12, further comprising at least a first orientation mark and a second orientation mark, the first orientation mark and the second orientation mark being on a first side of the thermal printer medium and allowing for distinguishing between the print side and the back side of the thermal printer medium.

14. The method of claim 13, the first orientation mark being at a first end of the thermal printer medium and the second orientation mark being at a second end of the thermal printer medium, the first orientation mark and the second orientation mark be located diagonally across the thermal printer medium.

15. An election printer medium configured to be used for printing vote records in an election voting system, comprising:
    a print side of the election printer medium, the print side of the election printer medium configured to have a region on which a printed vote record of an election voting system may be provided;
    a back side of the election printer medium, the back side opposing the print side;
    a first orientation mark, the first orientation mark being located on a first side, the first side being one of the print side or back side; and
    a second orientation mark, the second orientation mark being located on the first side,
    wherein the first orientation mark is located at a first end of the election printer medium and the second orientation mark is located at a second end of the election printer medium,
    wherein the first orientation mark and the second orientation mark provide optical contrast from other portions of the election printer medium such that optical detection of the first orientation mark and second orientation mark may be detected before the printer prints on the election printer medium, and
    wherein a second side of the printer medium has no orientation marks.

16. The election printer medium of claim 15, the first orientation mark and the second orientation mark being located diagonally across the election printer medium.

17. The election printer medium of claim 16, the location of the first orientation mark and the second orientation mark being diagonally symmetrical.

18. An election voting system, comprising:
    an election voting device, the election voting device including at least a display;
    a printer, the printer coupled to the election voting device so that printed vote records may be printed from the print based on voting at the election voting device;
    an election printer medium, the election printer medium comprising:
        a print side of the election printer medium;
        a back side of the election printer medium, the back side opposing the print side;
        a first orientation mark, the first orientation mark being located on a first side, the first side being one of the print side or back side; and
        a second orientation mark, the second orientation mark being located on the first side,
        wherein the first orientation mark is located at a first end of the election printer medium and the second orientation mark is located at a second end of the election printer medium,
        wherein the first orientation mark and the second orientation mark provide optical contrast from other portions of the election printer medium such that optical detection of the first orientation mark and second orientation mark may be detected before the printer prints on the election printer medium, wherein a second side of the printer medium has no orientation marks; and an optical sensor, the optical sensor located at an entrance to the printer, the election voting device controlling an election process flow based at least in part upon detection by the optical sensor of at least one of the first orientation mark and the second orientation mark, wherein the election voting system is configured so that the optical sensor need only scan one of (a) the first end of the election printer medium or (b) the second end of the election printer medium, the scan detecting the orientation of the print side or the back side of the election printer medium, wherein the detecting of the print side or the back side is independent of a 180 degree rotation of the election printer medium.

19. The election voting system of claim 18, the first orientation mark and the second orientation mark being located diagonally across the election printer medium.

20. The election voting system of claim 19, the election printer medium being formed of thermal paper.

\* \* \* \* \*